Figure 1:
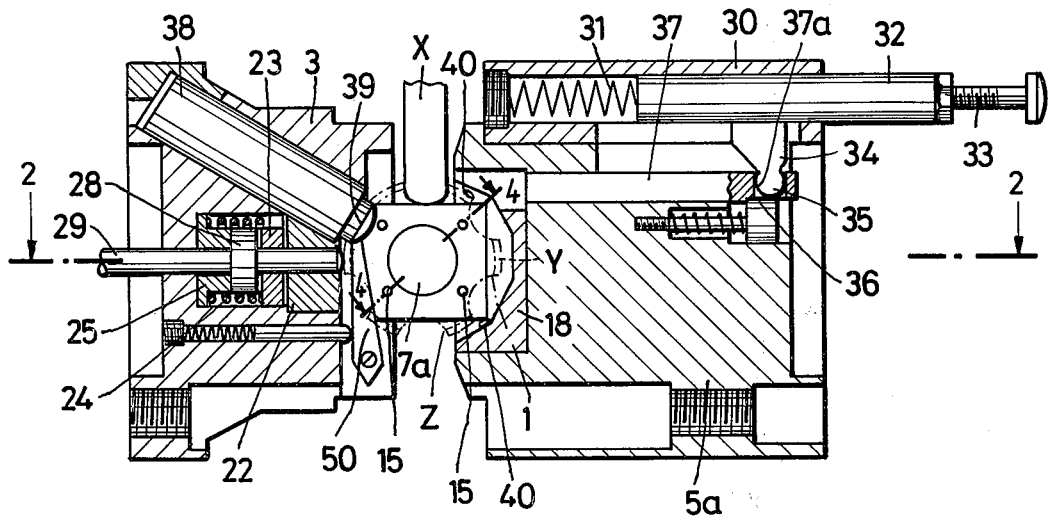

United States Patent [19]
Ditzel et al.

[11] 3,934,378
[45] Jan. 27, 1976

[54] MECHANISM FOR MAKING ROLLER-HUB GROOVES

[76] Inventors: Heinz Ditzel; Werner Ditzel, both of Hainstr. 29, Schoneck-Kilianstadten, Germany

[22] Filed: Sept. 12, 1974

[21] Appl. No.: 505,532

[30] Foreign Application Priority Data
Sept. 13, 1973 Germany............................ 2346111

[52] U.S. Cl............................ 51/216 ND; 51/217 R
[51] Int. Cl.²......................................... B24B 41/06
[58] Field of Search....... 51/216 ND, 216 H, 237 R, 51/289 R, 291, 217 R

[56] References Cited
UNITED STATES PATENTS
| | | | |
|---|---|---|---|
| 921,983 | 5/1909 | Hanson........................... | 51/216 ND |
| 1,933,149 | 10/1933 | Poole.............................. | 51/216 ND |
| 2,289,683 | 7/1942 | Rzeppa et al..................... | 51/217 R |

Primary Examiner—Harold D. Whitehead
Attorney, Agent, or Firm—Haseltine, Lake & Waters

[57] ABSTRACT

A clamping and dividing mechanism for the precision machining of workpieces, for example annular cylinder grooves of ball races and the like, on a machine tool having a rotatable workpiece receiver, a counter support and a workpiece holder therebetween, the mechanism comprising various elements associated with the just-mentioned basic parts of the machine tool, namely: parallel, resiliently guided cylinder members in the receiver, assigned to a generated ball surface of the workpiece and aligned with a surface of the latter; an insert in the support, having at least two jaws facing the workpiece and engaging the same; means for guiding the holder in bores provided in the receiver and the support, respectively, in the form of two opposed swivel axles; and a trunnion associated with the holder, perpendicular to the direction of machining, and provided with support surfaces for the workpiece, that are parallel with the direction of machining.

8 Claims, 7 Drawing Figures

3,934,378

MECHANISM FOR MAKING ROLLER-HUB GROOVES

The present invention relates to a clamping and dividing mechanism for the precision manufacture of the annular cylinder grooves of ball races or the like. For short, it can be termed a mechanism for making roller-hub grooves.

For the precision manufacture of annular grooves of ball races or roller hubs, as employed in universal joints, there are known clamping and dividing mechanisms which immobilize the grooves during the precision manufacture (such as polishing and the like) and further rotate them about the divider after completing the precision machining of one of the incremental surfaces. For this purpose, precision machining requires a degree of accuracy which lies in the range of ±2 $\mu$.

Such clamping and dividing mechanisms are known per se, however, the prior-art constructions do not provide the predetermined requirements with respects to tolerances and accuracy to size.

Accordingly, it is an object of the present invention to provide a novel construction for such a clamping and dividing mechanism which satisfies all presently set requirements with respect to the just mentioned characteristics.

According to major features of the invention, a clamping and dividing mechanism is provided for the precision machining of workpieces, for example annular cylinder grooves of ball races and the like, on a machine tool which has conventional elements constituted by a rotatable workpiece receiver, a counter support and a workpiece holder therebetween, the mechanism comprising parts additional to the conventional elements, namely means for guiding the holder in respective bores provided in the receiver and the support, in the form of two opposed swivel axles; preferably three parallel, resiliently guided cylinder members in the receiver, assigned to a surface of the workpiece and aligned therewith; an insert in the support, having at least two jaws facing the workpiece for engagement; and a trunnion associated with the holder, perpendicular with the direction of machining, and provided with support surfaces for the workpiece, that are parallel with the direction of machining.

According to additional, optional features of the invention, hard metal may be used for at least some of the cylinder members or their engaging surfaces, for at least edge portions of the jaws of the support insert, for a cover of a locking pin receivable by the receiver, and serving for precisely aligning the rotated workpiece, and/or at least the front surfaces of bolts guided in bores of the holder, thereby greatly increasing the efficiency and precision of the operations with the inventive mechanism.

According to further, specific feature of the invention, the two outer cylinder members may be pre-loaded by a spring while the third, intermediate member has a slot-pin connection, and a control rod for manipulating the mechanism.

The support surfaces of the trunnion, associated with the holder, may have end rings thereon for engaging a flange, the support surfaces resting against radial arms of a slide that is biased for sliding in the trunnion, the space defined by the end rings and behind the radial arms being preferably filled with oil.

Finally, the invention also provides the use of a slide cap for the trunnion, with a spring for biasing the cap, and a ring flange on the cap for receiving the ends of the earlier-mentioned bolts that are guided in bores of the holder.

Figure 2:
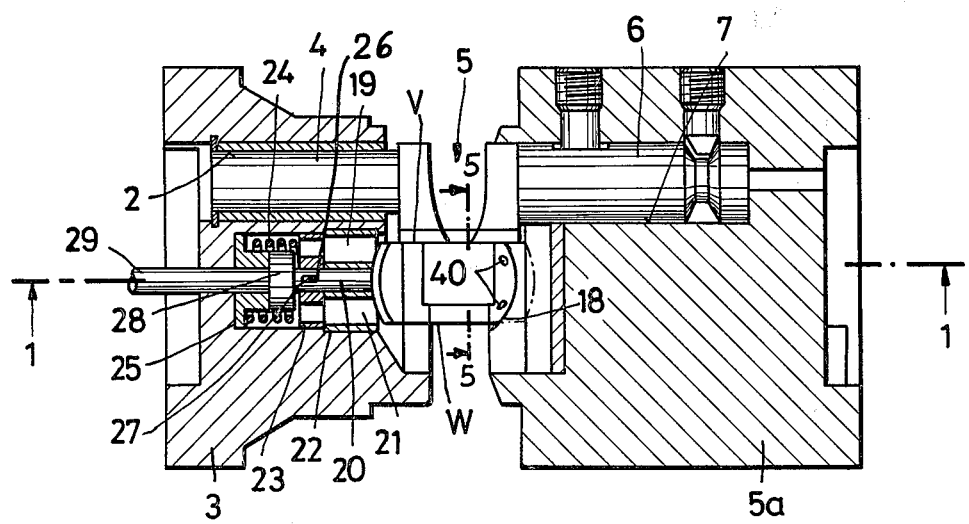
Figure 3:
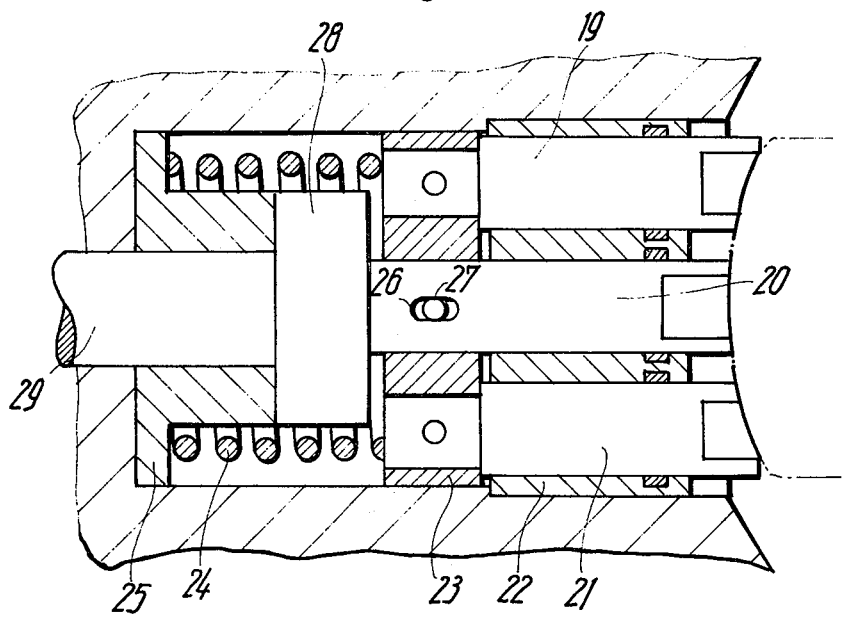
Figure 4:
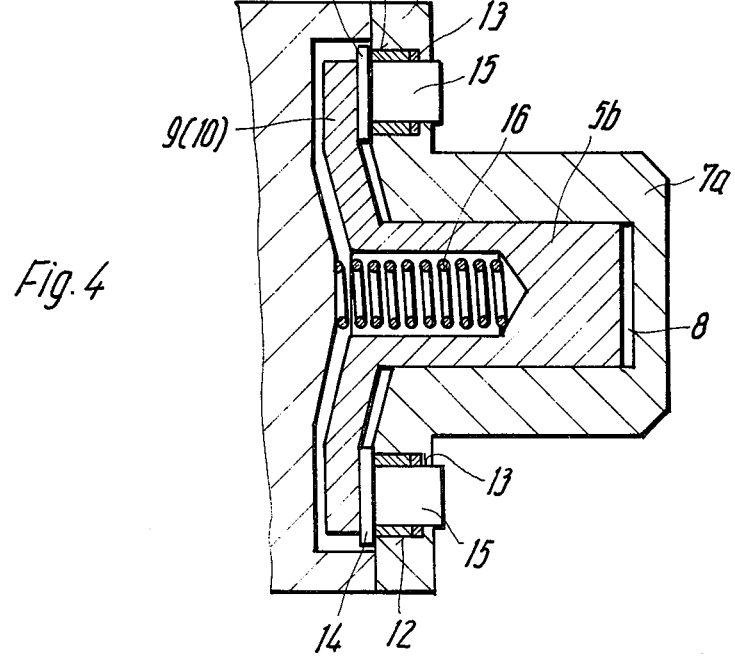
Figure 5:
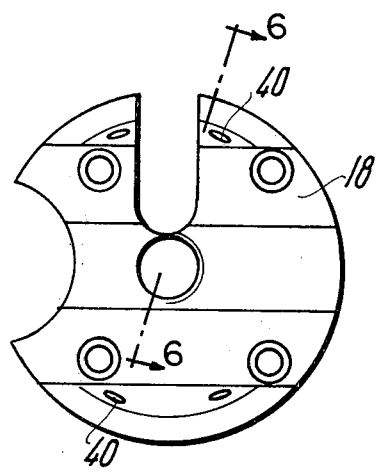
Figure 6:
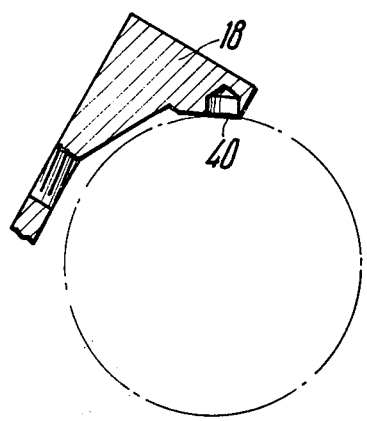
Figure 7:
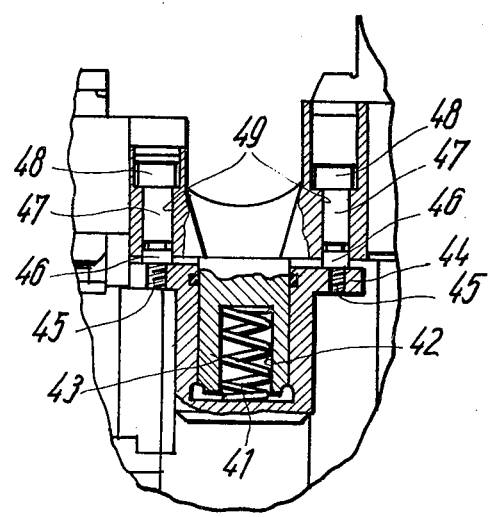

Reference may now be had to the following detailed description of the novel clamping and dividing mechanism according to the invention, taken in conjunction with the exemplary embodiments illustrated in the accompanying drawings, wherein:

FIGS. 1 and 2 show two axial sections of the mechanism according to the present invention, rotated by 90° one with respect to the other, the former taken along line 1—1 of the latter, and FIG. 2 along line 2—2 of FIG. 1;

FIGS. 3 and 4 show two details of the mechanism on an enlarged scale, namely the former constituting a left-hand center part of FIG. 2, and the latter being taken along line 4—4 of FIG. 1;

FIGS. 5 and 6 show two partial sectional views, namely the former along line 5—5 of FIG. 2 and the latter along line 6—6 of FIG. 5; and FIG. 7 shows a detailed section of a modified embodiment also taken along line 4—4 of FIG. 1.

Referring now in detail to the drawings, and particularly to FIGS. 1 and 2, between a headstock and a tailstock of an otherwise known machine tool, a workpiece receiver 3 and a counter support 5a are mounted. Between these two parts there is located a workpiece holder 5 which is guided by means of two opposite swivel axles 4, 6 in corresponding bores 2, 7 of the receiver 3 and the support 5a, respectively.

A tool X, such as a grinding wheel, serves for the precision machining of workpieces, for example annular ring grooves Z (to be explained later in more detail) of a roller hub or ball race 1. Such roller hubs are being used for quite a few years in lieu of earlier universal joints, particularly in motor vehicles. This workpiece 1 consists of case-hardened steel. After introduction, the workpiece is mounted between the two parts 3, 5a in a pre-centered manner.

The workpiece receiver 3 and the opposite support 5a already take care of the eccentricity to be maintained during the machining of the workpiece. The swivel axle 4 of the holder 5, retained in the bore 2 of the receiver 3, as well as the axle 6 guided in the counter support 5a, serve for the pre-orientation of the roller hub 1. The two axles 4, 6 are equally axially directed with respect to each other and are lapped. The workpiece holder 5 is generally U-shaped between the axles 4, 6 and carries on the web of the U-shaped part a trunnion 7a.

As can best be seen from FIG. 4, in a blind hole 8 in the trunnion 7a there is retained a slide 5b, displaceable against the force of a spring 16 in the hole 8. The slide 5b has an end collar 9 which is conically reduced and then extends radially to the slide 5b. The collar 9 has the shape of an axial cross of which the arms extend radially outwardly. The trunnion 7a is provided at its end with a radial flange 11 which has four crosswise through apertures 12. These apertures are reduced to a smaller diameter 13 at the ends facing toward the trunnion 7a. They are then gripped by the arms of the slide 5b located above the cross.

In the apertures 12, 13 there are guided preferably hard-metal plugs 15 provided with end rings 14. These rings determine a free space between the radial flange 11 and the cross 10, which is preferably filled with oil.

The space between the cross 10 and the support 5a may also be filled with oil. By means of the spring 16 the slide 5b is retained in a stop position at the end rings 14. The plugs 15 are sealingly guided in the apertures 12, 13.

The mounted workpiece 1 is retained in a pre-centered manner on and by the trunnion 7a, concurrently resting on the plugs 15. The support 5a sitting on the tailstock of the machine tool is provided with an insert 18 (see also FIGS. 5, 6) on the side facing the workpiece. The support 5a is displaceable in an axial direction of the workpiece. It is moved outwardly for the insertion of the workpiece 1, and after that it can be brought into the operative position shown in FIG. 1.

The receiver 3 holds in a parallel arrangement three cylinder members 19, 20, 21 (see FIG. 3) which are reduced to a smaller diameter on their faces directed toward the workpiece. These members are slidably guided in two successively positioned sleeves 22, 23 of the receiver 3. Their surfaces toward the workpiece are preferably covered with a hard metal. They engage the already machined generated ball surfaces of the workpiece.

The two outer cylinder members 19, 21 are loaded by a buffer spring 24 which is mounted between an inner sleeve 25 of the receiver 3 and the respective members. The intermediate or center cylinder member 20 is axially slidable to a certain extent in the sleeve 22 through a slot-pin connection 26, 27 and adjustable by the aid of a control rod 29 through a collar 28 (see also FIG. 3). The member 20 is kept in continuous contact with the workpiece. Through its end pressure, the rod 29 releases the machine safety devices and thus frees the inventive clamping and dividing mechanism for operation.

Referring again to FIGS. 1 and 2, the holder 5a has a pin 32 displaceable in a longitudinal bore 30 against the effect of a spring 31, the pin having an adjustable end stop 33. The pin 32 carries a radially projecting follower stop 34 which extends into a recess 36 of a slide 37 by means of its projection 35. The slide 37 is guided in a bore 37a of the workpiece counter support 5a. When the pin 32 is actuated, together with the slide 37 that is taken along, the latter is displaced toward the workpiece and thereby introduces its rotation about the trunnion 7a. This movement is smaller than 60°. The receiver 3 carries a locking pin 38 which extends at an angle of 60° relative to the rotational axis of the workpiece, which pin is loaded by means of a spring (not shown). A cap of the pin 38 is preferably provided with a hard-metal cover 39. This cover is somewhat eccentrically directed relative to the axis of the pin 38 so that, upon rotation of the locking pin, through a micrometer screw drive connected therewith, the pin can be precisely oriented so that the workpiece 1 is also correspondingly adjusted. The locking pin 38 is precisely adjustable by means of an eccentric micrometer screw, and can thereby be finely adjusted in seconds of an arc. The pin 38 consequently allows precise alignment of the workpiece.

On its surface directed toward the workpiece 1, the counter support 5a has the earlier-mentioned insert 18 with four pairwise mutually oppositely located, stationary preferably hard-metal jaws 40 (see FIGS. 5,6). These jaws are associated with the already machined surfaces of the workpiece. The two ball or roller surfaces consequently encompass between them a third such surface.

For operation, the workpiece is mounted on the trunnion 7a, of the workpiece holder 5. The two cylinder members 19, 21 may yield against the respective biasing springs 24. The middle cylinder member 20 is oriented through the sleeve 23, the connection 26, 27, and the rod 29, and is consequently held against the workpiece 1. The hard-metal jaws 40 of the insert 18 contact the opposite side of the workpiece, touching two ball surfaces, thereby providing a rigid support and orientation of the workpiece. The alignment of the workpiece is effected by the locking pin 38 with its cover 39, the eccentric micrometer mechanism allowing the required fine adjustment. Concurrently therewith two cylinder ring grooves Z are being processed or machined that extend normal to the rotational axis of the workpiece 1, as will be explained later in full detail.

At the end of the first operating phase the two grinding discs are withdrawn so as to release the clamping mechanism. The machine is stopped and the counter support 5a is pulled back, so far to the right-hand side that the workpiece 1 lies free for rotation thereof. The pin 32 is moved toward the left-hand side, against the spring 31 acting thereon, entraining the slide 37 on effect of the follower stop 34. The slide 37 comes into contact with one of the ball or roller surfaces of the workpiece and rotates the same through the range of its active path. Consequently the rotation of the workpiece lies somewhat below 60°. The next cylinder surface, arriving due to the rotation of the workpiece, causes the pin 38 to be pushed back against the effect of its spring, and falls into the cylinder groove of the workpiece. Through the renewed engagement of the locking pin 38 with the groove of the workpiece, the same is rotated precisely by 60°, and may then be precisely oriented through the means of the adjusting mechanism of the pin 38.

The hard-metal plugs 15 of the trunnion 7a orient the workpiece parallel to the direction of machining.

The various hard-metal plugs or support surfaces 15 have been previously dressed to the required precise measurements. These plugs, hardly subject to wear, therefore provide precise orientation to the workpiece in the clamping mechanism and ensure a long period of use.

In accordance with the modified embodiment of FIG. 7, taken along line 4—4 of FIG. 1, there is located on the trunnion 7a a slide 43 which is loaded by means of a spring 41 disposed in a blind hole 42 of the trunnion 7a, the slide having a ring flange 44 at the foot of the end facing toward the trunnion 7a. The flange 44 receives in four threaded bores 45 respective screw stops 46. The latter sit on bolts 47 which have end rings 48. The bolts 47 are guided in appropriately reduced bores 49 of the counter support 5a. If required, the stops 46 may also have hard metal applied to the end faces thereof.

Those skilled in the art will recognize that the modified or slightly different structural parts 41,42, 43,47 and 48 find their counterparts in the earlier-discussed and illustrated parts 16, 8, 5b, 15 and 14, respectively.

The workpiece receiver 3 furthermore carries an aligning lever 50 (see FIG. 1) which lies before the workpiece 1, placed on the trunnion 7a in the operative position, supporting the same during alignment and centering.

All parts of the clamping and dividing mechanism are preferably constructed of the finest steel which may be hardened at certain locations, if necessary.

By way of explanation, it should be added that the lever 50 merely constitutes a safety expedient which is being applied in front of the workpiece to keep the same from falling off the trunnion 7a. The cylinder members 19, 21 hold the workpiece on one side. They are biased by the common spring 24, and they are held by the latter in close abutment with the workpiece. The metal cylinder member 20 rests with the left-hand end, as viewed in the drawings, on the collar 28 and is lengthwise displaceable with the control rod 29, the elongated slot 26 permitting and limiting the movement in connection with the pin 27. When moving the member 20 and the rod 29 towards the left-hand side, as can best be visualized in FIGS. 1 and 3, an end switch (not shown) is actuated which initiates the procedure. Preferably the switch is made when the cylinder 20 touches the workpiece with its right-hand end.

In FIG. 1, the workpiece 1 (roller hub and the like) is shown with annular cylinder grooves Z that run centrally but eccentrically with respect to the rotating shaft of the workpiece, which grooves are to be machined or ground by the aid of the inventive clamping and dividing mechanism. FIG. 1 also shows peripheral surfaces Y of the workpiece which have already been machined. The plugs 15 provide an elastic support for the workpiece. The counter support 5a is provided with the insert 18 that has the jaws or supporting surfaces 40 for the workpiece, preferably four of them, as can be seen in the sectional view of FIG. 5. One such support is shown in FIG. 6 in its correlation to the insert 18.

As has been indicated earlier, the two sectional illustrations of FIGS. 1 and 2 are rotated by 90° one with respect to the other, as can be seen by the respective section lines 2—2 and 1—1. While FIG. 1 shows the workpiece 1 in connection with the tool X and the just described grooves Z and surfaces Y, the opposite surfaces of the workpiece are shown in FIG. 2 identified by letters V and W, which faces do not have to be precision machined. The preferably four plugs 15 (shown in FIGS. 1 and 4 but not in FIG. 2) merely support the rear of the workpiece 1.

During the operation of the inventive mechanism, after two oppositely disposed grooves Z have been ground, the right-hand tool portion is removed from the workpiece by a sufficient distance together with the jaws 14. When re-engaging these parts, the pin 32 and the end stop 33 is pushed into the counter support 5a, against the effect of the spring 31, by an appropriate stop of the machine, thereby entraining the slide or follower 37 by intermediary of the nose-shaped projection 35. By this movement, the workpiece 1 is rotated by about 60° so that the two consecutive annular ring grooves Z are now ready to be machined. This process is repeated after the grooves Z have been ground that are presently opposite to the tool X (such as the earlier-described grinding wheel). Hereafter the process is repeated once more to grind the third pair of grooves Z in the earlier-described manner.

It will be understood from the foregoing that the description relates only to preferred embodiments of the clamping and dividing mechanism, such as for making roller-hub grooves, and departures can be made from the exemplary features, without departing from the spirit and scope of the invention.

What we claim is:

1. A clamping and dividing mechanism for the precision machining of workpieces (1), for example annular cylinder grooves of ball races and the like, on a machine tool having a rotatable workpiece receiver (3), a counter support (5a) and a workpiece holder (5) therebetween, the mechanism comprising, in combination: means (4, 6) for guiding said holder in respective bores (2, 7) provided in said receiver and said support, in the form of two opposed swivel axles (4, 6); three parallel, resiliently guided cylinder members (19, 20, 21) in said receiver, assigned to a generated ball surface of the workpiece and aligned with a surface of the latter; an insert (18) in said support, having at least two jaws (40) facing the workpiece and engaging the same; and a trunnion (7a) associated with said holder, perpendicular to the direction of machining, and provided with support surfaces (15) for the workpiece, that are parallel with the direction of machining.

2. The mechanism as defined in claim 1, further comprising a spring (24) for pre-loading two (19, 21) outer ones of said cylinder members (19, to 21), and a slot-pin connection (26, 27) for the third (20), intermediate cylinder member, said connection being axially slidable to some extent, and having a control rod (29) for its manipulation.

3. The mechanism as defined in claim 1, where said support surfaces (15) are received by a flange (11) of said trunnion (7a) for resilient guidance therealong.

4. The mechanism as defined in claim 1, further comprising end rings (14) on said support surfaces (15), for engaging a flange (11) of said trunnion (7a), said support surfaces resting against radial arms (10) of a slide (5b) that is biased (16) for movement in said trunnion (7a), the space defined by said end rings and the space left behind said radial arms being filled with oil.

5. The mechanism as defined in claim 1, further comprising a locking pin (38) associated with said receiver (31), which is spring-biased and is tilted by about 60° with respect to the direction of machining, a cover (39) on said pin, eccentrically disposed by "2n" with respect to the axis of said pin, and micrometric adjusting means for the latter.

6. The mechanism as defined in claim 1, further comprising a pin (32) receivable by said support (5a), which pin is spring-biased (31) and slidable parallel to the direction of machining, said pin having a radial follower stop (34) with a projection (35), the latter engaging a bore (37a) of a follower (37), the latter rotating the workpiece by about 60° when said pin is moved, and a locking pin (38) having a cover (39) thereon for precisely aligning the rotated workpiece.

7. The mechanism as defined in claim 1, further comprising a slide cap (43) for said trunnion (7a), a spring (41) attached to said trunnion for biasing said cap, and a ring flange (44) on said cap for receiving the ends of bolts (46) in threaded bores (45), said bolts being guided in bores (49) in said holder.

8. The mechanism as defined in claim 1, wherein at least one portion of at least one of said cylinder members (19 to 21), of said jaws (40) and of said support surfaces (15) is made of hard metal; and further comprising a locking pin (38) receivable by said receiver (3) with a cover (39) thereon; and bolts (46) forming part of means (41, 44, 45) for biasing a slide cap (43) for said trunnion (7a); at least one of said cover and said bolts being also made of hard metal.

* * * * *